3,192,055
METHOD OF ASSURING HOMOGENEITY OF DRY FOOD ADDITIVE MIXTURES
Ray F. Beerend, Vermilion, and Haskell C. Needle, Lorain, Ohio, assignors, by mesne assignments, to Basic Food Materials, Inc., a corporation of Delaware
No Drawing. Filed Mar. 19, 1962, Ser. No. 180,843
1 Claim. (Cl. 99—222)

This invention relates to a method of assuring homogeneity of dry food additive mixtures.

The problem of homogenity of mixtures is one which has plagued manufacturers of food additives for many years. Because the quality of the mixture and, frequently, the results achieved in its use, are concerned intimately with the homogeneity of the mix, responsible manufacturers of such additives have long tried without success to find a satisfactory and commercially practicable way to assure themselves and their customers that components have been combined so intimately and so thoroughly that any given portion will be exactly identical with every other portion of the batch. The problems particularly arise in dry mixes sold for use as curing compounds, phosphate and binder compounds, tenderizer powders, seasoning mixes, and the like.

In many instances, as many as a dozen individual ingredients may go into a mixture and there has been no way of knowing at what point in the mixing operation homogeneity of the combination is achieved unless exhaustive analytical and microscopic studies are made on various portions of the batch. Because of the time and expense involved, usually a small sample of the batch is analyzed chemically. This gives no indication or even approximate indication of the analysis of other parts of the batch. Especially in cases where minute percentages of materials are used to mix with larger amounts of other ingredients, there is no way of knowing that uniformity has been obtained if all materials are alike in color, and particularly if they are white or very light in color.

This is particularly true of such compounds as "meat curing mixtures" such as the materials used in the curing of hams, bacon, bolognas, wieners and the like. In this type of compound an intimate mixing of the active ingredients such as sodium or potassium nitrites or nitrates with salt or other carriers is of the utmost importance. All ingredients of such curing compounds are normally alike (white) in color. An imbalance of the nitrites to any large degree will result in an underdose or overdose of this material in the subsequent meat product, causing on the one hand a condition known as undercuring and on the other, as overcuring, resulting in discoloration in the latter case, of the type commonly known as "nitrite burn." Both these types of situations are to be avoided by the processor as the goods become unsalable and could represent considerable losses of merchandise in returned goods as well as loss of prestige and money.

Previous attempts to solve this problem include the steps of dissolving all of the ingredients in water, mixing the solutions and then evaporating the water and drying and powdering the resulting solids. While this assures uniformity, it involves very great expenditures in machinery, equipment, buildings, and labor.

The present invention contemplates coloring at least one of the ingredients of the batch with a permissible (FDA and MIB approved) harmless dye or pigment such as food coloring. When the ingredient so colored is mixed with other ingredients which are not so colored, then, provided the color is a proper type, the whole batch takes on a uniform shade of the selected color, this result being achieved only when the mixture is perfectly homogeneous throughout. Even slight failure to achieve homogeneity throughout the batch is immediately apparent visually. Ordinarily the ingredient colored is the ingredient which is most critical. However, this is not necessarily the case. The characteristics required in the coloring ingredient will be dealt with hereafter.

*Example 1*

A 1000 pound batch of curing compound contains:

910 lbs. salt
90 lbs. sodium nitrate and sodium nitrite mixture
10 oz. cochineal All of these ingredients are of a uniform crystalline nature and snow white in color.

To achieve absolutely uniform results when the active ingredients are mixed together, a pre-mix is made by mixing the 90 pounds of nitrogen components with 10 ounces of cochineal until the entire mass is uniformly dyed by the cochineal. This can be done in five minutes in a "Hobart" mixer. The dyed mixture of nitrites and cochineal is then added to the 910 pounds of salt and mixed until the complete batch takes on an even uniform pinkish color. This is preferably done in a ribbon type blender of stainless steel. In the resulting mix, it is visually apparent when the dyed nitrites are uniformly and evenly dispersed throughout the entire batch. It will be observed that in this batch the nitrite mixture is the critical component in the sense that lack of proper dispersion of the nitrites will result in either undercuring or overcuring of the meat as above described. Accordingly this is an instance of adding color to the critical ingredient.

This same principle can be resorted to in other combinations, such as various phosphate compounds used in pumping solutions or in direct addition to meat emulsions in the chopper or other means used to blend meat products for production of the various items for the trade.

*Example 2*

As an example of this type of compounding, we have mixed the following ingredients in a manner to achieve the result desired:

40 lbs. tetrasodium pyrophosphate
40 lbs. sodium acid pyrophosphate
20 lbs. potassium polymetaphosphate
1 oz. cochineal A five pound portion of the potassium polymetaphosphate is mixed with the cochineal until uniformity of color is obtained. The rest of the potassium polymetaphosphate is then added and thoroughly blended to uniformity in color. Either one of the other phosphates is then added and mixed until color is uniform and the final ingredient is then added and mixed until color is uniform throughout. While the invention is here utilized principally to aid in the compounding of the mixture, it is still true that any deviation from homogeneity is visually apparent in the finished product.

As a further example to indicate the effectiveness of our invention, we utilize this principle in demonstrating the complete physical intermingling of the active ingredient in tenderizing powders where small amounts of proteolytic enzymes such as papain, bomelin, ficin, etc., either by themselves or in combination, are mixed with a carrier such as salt, sugar or other materials to produce the article of commerce known to the trade as a tenderizing powder. It is, of course, obvious that the example given may be varied in many ways without departing from the scope of our invention:

*Example 3*

12 oz. papain—2 oz. bromelin, 2 oz. ficin
10 lbs. monosodium glutamate
89 lbs. salt or combination of salt and dextrose and seasonings
¼ oz. cochineal The cochineal is mixed intimately with the papain and the other enzymes until uniform. Then the monosodium glutamate is added and mixed thoroughly. Finally, the salt and/or dextrose are added and mixed until uniform color is obtained. If seasonings are added to tenderizer powders, they may be mixed in with the combination cited when the monosodium glutamate is added to the batch. They may, of course, be added at any point in the mixing schedule but we prefer to add the smallest amounts of materials in terms of weight before the ingredients of greater volume are added.

It may be noted that even though one or more of the ingredients is of high color, the colored ingredient may be of a type that does not readily transmit this color to the surrounding individual crystals and a spotty or speckled effect results. Thus, even when the ingredients are not all of the same color, it may still be desirable to use a coloring agent for the purposes of this invention.

It will be observed that in the foregoing examples cochineal has been used as a preferred color. This is only partly attributable to the brilliance of the color and to the fact that the color of cochineal does not normally occur in ingredients of the type with which the invention is particularly concerned. In addition to this, cochineal is an example of a color which has the property of imparting its color to the surrounding media and is compatible with all these powders so that complete uniformity can be noted when all individual particles in the mass have taken on this shade. Not all colored materials, even though they are brilliantly colored, have the desired properties. In certain instances, it may be desirable to have more than one pre-mix. As an example of a compound using pre-mixes which are separately colored and then united to produce a third color, see the following formula:

*Example 4*

Pre-mix 1:
   6 lbs. of sodium nitrite mixed with ¼ oz. of cochineal until the batch is of uniform red color.
Pre-mix 2:
   3 lbs. of sodium nitrate mixed with 1 oz. of turmeric powder until the whole batch is of uniform yellow color.
Final mix:
   Pre-mix 1 and pre-mix 2 mixed with 91 lbs. of common salt (sodium chloride) until the whole batch is a uniform shade.

In the foregoing example, the cochineal colors one ingredient; the turmeric colors another; and the light yellow, pinkish color of the completed batch shows that these two ingredients are thoroughly and homogeneously distributed both with respect to the salt and with respect to each other.

The invention contemplates that for food purposes the color may be any of those approved in the regulations governing meat inspection of the U.S. Department of Agriculture, 1960, Section 18.7, m(1), (2) and (3); of FDA regulations on color additives, Part 8, paragraph 1305, as listed in Food, Drug, Cosmetic Law Report, vol. 1, pages 1305 through 1307.

The invention is not limited to water soluble dyes, as there are several fat soluble dyes in liquid form as oleoresins of annatto, paprika, turmeric and the like that may be used for this purpose.

Also, while the dye or coloring matter is preferably applied to the ingredient that is critical, this is not an essential of the invention, as the application of the color to some other ingredient may form a perfectly appropriate premix which, when mixed with the batch, will show homogeneity when the color is uniformly distributed throughout.

A further requirement of color has already been suggested, namely, that it be compatible with the other materials of the batch. One advantage in the use of cochineal is that so small an amount will give the desired result. We have succeeded in demonstrating homogeneity when the cochineal only amounted to .063 percent of the entire mass (1 oz. per 100 lbs.). In fact, in the tenderizing powder, we have used cochineal in amounts as low as .007 percent (⅛ oz. per 100 lbs.).

It is to be understood that the examples given are merely an indication of the types of combinations that lend themselves to this process and that any combinations of ingredients for whatever purpose would come within the scope of our invention if the purpose is to demonstrate and guarantee uniformity and complete dispersion of product by addition of acceptable approved food color, whether dry or liquid. Our invention also contemplates that any type of mechanical mixer known to the art can be used, whether it be the vertical type, horizontal ribbon or dough mixer, cyclone, ball mill, muller, or other mixer whatever.

We claim:

A method of mixing a multiple component batch of curing compound, which method comprises the steps of making a first pre-mix batch by commingling dry crystalline sodium nitrite with dry cochineal and dry mixing until the pre-mix batch is of uniform red color, making a second pre-mix batch by commingling dry sodium nitrite with dry turmeric powder and dry mixing until the second pre-mix batch is of uniform yellow color, and making a final batch by commingling the dry first pre-mix batch and the dry second pre-mix batch with crystalline common salt and mixing said salt and said pre-mix batches dry until the whole resulting multiple component batch is of uniform color.

References Cited by the Examiner

UNITED STATES PATENTS

| | | | |
|---|---|---|---|
| 2,157,755 | 5/39 | Harrel et al. | 99—2 |
| 2,696,455 | 12/54 | Blair | 167—53 |
| 2,712,997 | 7/55 | Cooley | 99—2 |

OTHER REFERENCES

Remington's Practice of Pharmacy, 11th Ed., 1956, page 1164.

A. LOUIS MONACELL, *Primary Examiner.*

ABRAHAM H. WINKELSTEIN, *Examiner.*